United States Patent
Li et al.

(10) Patent No.: US 9,794,016 B2
(45) Date of Patent: Oct. 17, 2017

(54) SYSTEMS AND METHODS FOR PROCESSING SPACE-MULTIPLEXED OPTICAL SIGNALS

(71) Applicant: University of Central Florida Research Foundation, Inc., Orlando, FL (US)

(72) Inventors: Guifang Li, Orlando, FL (US); Ibrahim T. Ozdur, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 200 days.

(21) Appl. No.: 13/646,457

(22) Filed: Oct. 5, 2012

(65) Prior Publication Data
US 2013/0121698 A1    May 16, 2013

Related U.S. Application Data

(60) Provisional application No. 61/543,496, filed on Oct. 5, 2011.

(51) Int. Cl.
H04J 14/00    (2006.01)
H04J 14/04    (2006.01)

(52) U.S. Cl.
CPC ........... *H04J 14/00* (2013.01); *H04J 14/04* (2013.01)

(58) Field of Classification Search
CPC .... H04B 10/2581; H04B 10/12; H04B 10/50; H04B 10/532; G02B 6/0288; G02B 6/02042; G02B 6/02047; G02B 6/2937; G02B 6/32; G02B 26/0833; G02B 6/262; G02B 6/3512; G02B 6/3556; G02B 6/3598; H04J 14/00; H04J 14/02; H04J 14/04; H04J 14/021; H04J 14/0212
USPC ...................... 398/43, 45, 85, 86, 88, 65–79
See application file for complete search history.

(56) References Cited

U.S. PATENT DOCUMENTS

| | | | |
|---|---|---|---|
| 6,453,083 B1* | 9/2002 | Husain et al. | 385/17 |
| 6,456,429 B1* | 9/2002 | Wu | |
| 6,477,295 B1* | 11/2002 | Lang | G02B 6/2817 372/6 |
| 6,636,664 B2* | 10/2003 | Snyder | G02B 6/3524 385/115 |
| 6,678,476 B1* | 1/2004 | Hou | 398/79 |
| 6,934,438 B2* | 8/2005 | Hoke | G02B 6/359 385/16 |
| 7,043,104 B1* | 5/2006 | Bratkovski et al. | 385/12 |

(Continued)

OTHER PUBLICATIONS

Chen, et al., "Monolithic Silicon Chip with 10 Modulator Channels at 25 Gbps and 100-GHZ Spacing", ECOC Postdeadline Papers, 2011 OSA.

(Continued)

*Primary Examiner* — Hibret Woldekidan
(74) *Attorney, Agent, or Firm* — William Greener; Bond, Schoeneck & King, PLLC

(57) ABSTRACT

In one embodiment, an optical system for processing space-multiplexed optical signals includes an input fiber that propagates multiple spatially-separated optical signals, a photonic signal processor that receives the multiple spatially-separated optical signals and simultaneously processes those signals, and an output fiber that receives at least one of the processed signals.

28 Claims, 10 Drawing Sheets

(56) References Cited

U.S. PATENT DOCUMENTS

| | | | |
|---|---|---|---|
| 7,664,348 B2* | 2/2010 | Ma | G02B 6/351 359/17 |
| 8,725,001 B2* | 5/2014 | Fini | G02B 6/02042 398/142 |
| 8,822,905 B2* | 9/2014 | Ryf | G02B 6/4206 250/216 |
| 9,263,846 B2* | 2/2016 | Li | H01S 3/067 |
| 2002/0181046 A1* | 12/2002 | Jeong | 359/124 |
| 2003/0161019 A1* | 8/2003 | Zhang | G02B 6/2746 359/27 |
| 2004/0136680 A1* | 7/2004 | Medina et al. | 385/140 |
| 2005/0018958 A1* | 1/2005 | Huang | G02B 6/3586 385/18 |
| 2005/0031255 A1* | 2/2005 | Schroeder | G02B 6/3502 385/18 |
| 2005/0069257 A1* | 3/2005 | Bhagavatula et al. | 385/33 |
| 2005/0111073 A1* | 5/2005 | Pan | G02B 6/266 359/280 |
| 2008/0112668 A1* | 5/2008 | Terada et al. | 385/24 |
| 2008/0292255 A1* | 11/2008 | Stevens et al. | 385/117 |
| 2009/0219523 A1* | 9/2009 | Morris | G01N 21/474 356/300 |
| 2010/0329671 A1* | 12/2010 | Essiambre et al. | 398/44 |
| 2011/0274435 A1* | 11/2011 | Fini | G02B 6/02042 398/139 |
| 2012/0251045 A1* | 10/2012 | Budd et al. | 385/33 |
| 2013/0077967 A1* | 3/2013 | Woodward et al. | 398/44 |
| 2013/0088771 A1* | 4/2013 | Li et al. | 359/341.3 |
| 2013/0236175 A1* | 9/2013 | Sethumadhavan | H04J 14/04 398/55 |
| 2014/0029941 A1* | 1/2014 | Bratkovski | H04J 14/04 398/43 |
| 2014/0140694 A1* | 5/2014 | Zhou | H04J 14/04 398/44 |
| 2015/0086200 A1* | 3/2015 | Xie | H04B 10/2581 398/44 |
| 2015/0098697 A1* | 4/2015 | Marom | H04J 14/04 398/44 |

OTHER PUBLICATIONS

Mulvad, et al., "Ultra-High-Speed Optical Serial-to-Parallel Data Conversion in a Silicon Nanowire", Technical University of Denmark, ECOC Postdeadline Papers, 2011 OSA.

Doerr, et al., "Silicon Photonic Integrated Circuit for Coupling to a Ring-Core Multimode Fiber for Space-Division Multiplexing", Bell Laboratories and Sumitomo Electric Industries, Ltd., ECOC Postdeadline Papers 2011 OSA.

Tassaert, et al., "Bias-Free, Low Power and Optically Driven InP on SOI Switch for Remotely Configurable Photonic Packet Switches", Eindhoven University of Technology and INTEC, Ghent University, EOCO Postdeadline Papers 2011 OSA.

Liu, et al., "1.12-Tb/s 32-QAM-OFDM Superchannel with 8.6-b/s/Hz Intrachannel Spectral Efficiency and Space-Division Multiplexing with 60-b/s/Hz Aggregate Spectral Efficiency", Bell Labs The University of Melbourne, ECOC Postdeadline Papers 2011 OSA.

Xie, et al., "Colorless Coherent Receiver Using 3x3 Coupler Hybrids and Single-Ended Detection", Bell Labs and OFS Labs, ECOC Postdeadline Papers 2011 OSA.

Ossieur, et al., "A 10G Linear Burst-Mode Receiver Supporting Electronic Dispersion Compensation for Extended-Reach Optical Links", Tyndall National Institute and Vetesse Semiconductor Corporation, ECOC Postdealine Papers 2011 OSA.

Kataoka, et al., "2.56 Tbps (40-Gbps x 8-wavelength x 4-OC x 2-POL) Asynchronous WDM-OCDMA-PON using a multi-port Encoder/Decoder", NIICT, Dept. of AE., Dept of EE and IS; ECOC Postdeadline Papers 2011 OSA.S.

Ip, et al., "88x3x112-Gb/s WDM Transmission over 50km of Three-Mode Fiber with Inline Few-Mode Fiber Amplifier", NEC Labs America, et al., ECOC Postdeadline Papers 2011 OSA.

Koebele, et al., "40km Transmission of Five Mode Division Multiplexed Data Streams at 100Gb/s with low MIMO-DSP Complexity", Alcate-Lucent Bell Labes, ECOC Postdeadline Papers 2011 OSA.

Chandrasekhar, et al., "WDM/SDM Transmission of 10x128-Gb/s PDM-QPSK over 2688-km 7-Core Fiber Net Aggregate Spectral-Efficiency Distance Product of 40,320 km b/s/Hz", Bell Labs, OFS Labs, ECOC Postdeadline Papers 2011 OSA.

Kobayashi, et al., "45.2Tb/s C-band WDM transmission over 240km using 538 Gb/s PDM-64QAM Single Carrier FDM Signal with Digital Pilot Tone", NTT Network Innovation Labs and NTT Photonics Labs, ECOC Postdeadline Papers 2011 OSA.

Oda, et al., "80x224Gb/s Unrepeated Transmission over 240 km of Large-A eff Pure Silica Core Fibre without Remote Optical Pre-Amplifier", Fujitsu Labs, Fujitsu R&D Center, Optical Communications R&D Labs, ECOC Postdeadline Papers 2011 OSA.

Amaya, et al., "Gridless Optical Networking Field Trial: Flexible Spectrum Switching, Defragmentation and Transport of 10G/40G/100G/555G over 620-km Field Fiber", School of Computer Science and Electronic Engineering, Univ of Essex, BT Innovate & Design, Optoelectronics Research Center, ECOC Postdeadline Papers 2011 OSA.

Geisler, et al., "The First Testbed Demonstration of a Flexible Bandwidth Network with a Real-Time Adaptive Control Plane", Dept. of Electrical and Computer Engineering, Univ. of CA, Cisco Systems, ECOC Postdeadline Papers 2011 OSA.

Qian, et al., "Transmission of 115x100G PDM-8QAM-OFDM Channels with 4bits/s/Hz Spectral Efficiency over 10,181km", NEC Labs America, Submarine Network Division, ECOC Postdeadline Papers 2011 OSA.

Yung, et al., "First Demonstration of Multimode Amplifier for Spatial Division Multiplexed Transmission Systems", Optelectronics Research Centre, Phoenix Photonics, OFS Fitel Denmark, ECOC Postdeadline Papers 2011 OSA.

Ryf, et al., "Mode-Equalized Distributed Raman Amplification in 137-km Few-Mode Fiber" Bell Laboratories, LeCroy Corporation, OFS, ECOC Postdeadline Papers 2011 OSA.

\* cited by examiner

SYSTEMS AND METHODS FOR PROCESSING SPACE-MULTIPLEXED OPTICAL SIGNALS

CROSS-REFERENCE TO RELATED APPLICATION(S)

This application claims priority to U.S. Provisional Application Ser. No. 61/543,496, filed Oct. 5, 2011, which is hereby incorporated by reference herein in its entirety.

BACKGROUND

The recent increase in optical fiber data traffic has led to growing demand for additional capacity. One of the easiest ways to increase the fiber cable capacity is to increase the fiber count in the fiber cable. However, the size limitations often limit the fiber count.

Recently, spatial multiplexing, for example using multi-core fibers, has attracted interest due to their potential to multiply the capacity. Promising results prove that spatial multiplexing will be the next multiplexing technology. Implementing the spatial multiplexing will require many optical components for optical signal processing, such as power splitters, couplers, band pass filters, isolators, and the like. However, most of the current optical signal processing components are designed for single-core fibers and cannot be directly applied to a spatial multiplexing fiber such as multi-core fiber. The basic reason for this is that the photonic processors available today only have one degree of freedom (i.e., one spatial mode) whereas multi-core fibers have multiple (e.g., many) degrees of freedom. A straightforward way to build a photonic signal processor for a multi-core fiber using single-mode photonic signal processors is to separate the cores and then process each core individually using a dedicated single-mode photonic signal processor. This straightforward method increases the degrees of freedom, but also increases the number of required components by a factor equal to the number of cores (N). It would be desirable to avoid this multiplicity of components.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to implement spatial multiplexing, for example using multi-core fiber, without the need to multiply components of the system by the number of signals that are being transmitted. Disclosed herein is a new photonic signal processing technique for space-multiplexing of optical signals. In this technique, the facet of an input fiber is mapped or imaged to the facet of an output fiber after passing through a region where light associated with all signals travels in pre-designed directions. In some embodiments, both the input fiber and the output fiber are like multi-core fibers. The technique exploits the parallelism in bulk optics to provide the additional degrees of freedom needed for spatial multiplexing.

In the following disclosure, various specific embodiments are described. It is to be understood that those embodiments are example implementations of the disclosed inventions and that alternative embodiments are possible. All such embodiments are intended to fall within the scope of this disclosure.

Figure 1:
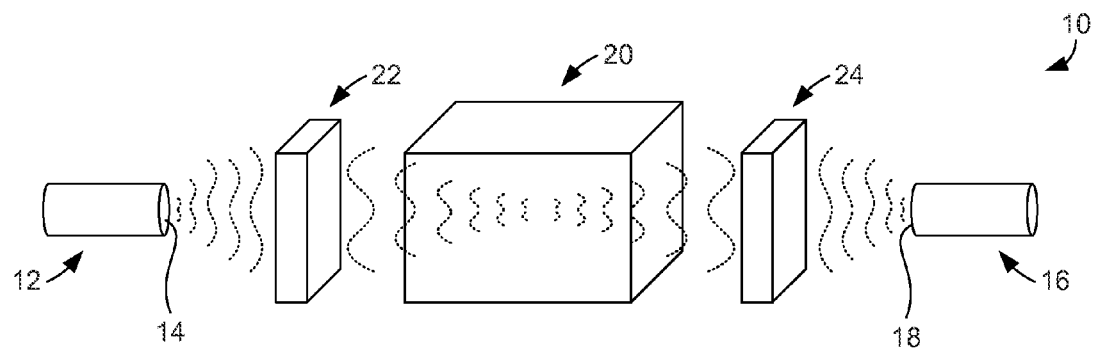
FIG. 1 is a schematic drawing of a first embodiment of an optical system for processing space-multiplexed optical signals.

A general schematic of an embodiment of an optical system 10 that can be used to process space-multiplexed optical signals is illustrated in FIG. 1. As is shown in that figure, the signal from an output facet 14 of an input fiber 12 is imaged onto an input facet 18 of a similarly configured output fiber 16 after passing through a photonic signal processor 20. In some embodiments, the input fiber 12 and the output fiber 16 are similarly configured multi-core fibers. It is noted, however, that the fibers 12, 16 can comprise any type of optical fiber that can be used for spatial multiplexing, such as multimode fibers or fiber bundles. Imaging systems 22 and 24 are used to focus and collimate the signals through the signal processor 20 and then couple the signals back to the output fiber 16. The signal processor 20 can take many different forms, some of which are described below in relation to FIGS. 7-15. In general, the signal processor 20 manipulates the light beams that form the signals in some way to achieve a desired outcome.

Figure 2A:
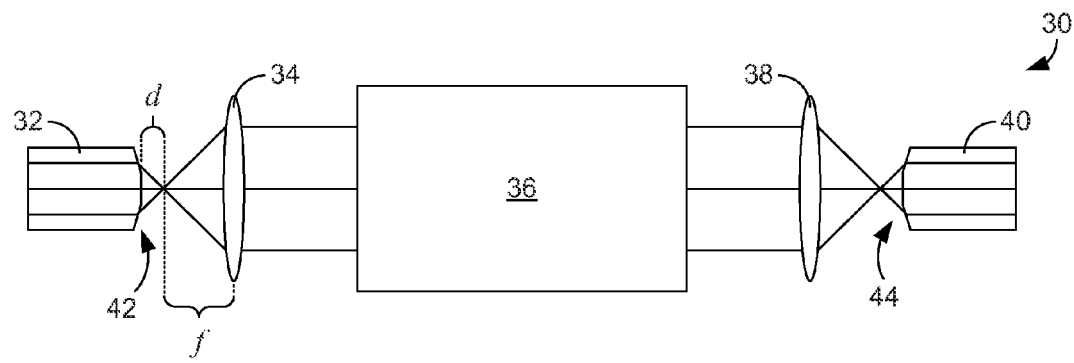
FIG. 2A is a schematic drawing of a second embodiment of an optical system for processing space-multiplexed optical signals.

FIG. 2A illustrates a further embodiment of an optical system 30 that can be used to process space-multiplexed optical signals. As is shown in that figure, the system 30 comprises an input fiber 32, a first imaging system in the form of a first lens 34, a photonic imaging processor 36, a second imaging system in the form of a second lens 38, and an output fiber 40. In the example of FIG. 2A, the input fiber 32 and the output fiber 40 comprise seven-core multi-core fibers (only three cores are visible).

Figure 2B:
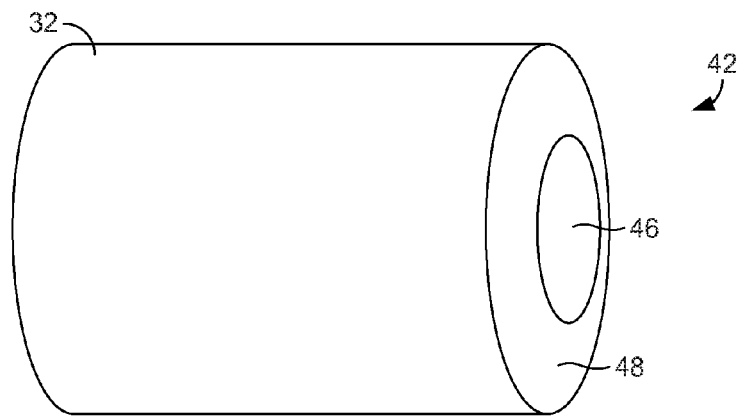
FIG. 2B is a schematic drawing of an input fiber used in the system of FIG. 2A.

As is apparent from the figure, the output end 42 of the input fiber 32 and the input end 44 of the output fiber 40 are convex and faceted. FIG. 2B provides a detail view of the input fiber 32 and its convex, faceted end. As is shown in that figure, the output end 42 of the fiber 32 includes a central circular facet 46 that is perpendicular to the optical axis of the system and an outer circular facet 48 that is angled backward so as to form the convex shape. Referring back to FIG. 2A, the facets enable tilting of the off-axis light beams conveyed by the input fiber 32 so that they will pass through the focal point. Because all of the beams pass through the focal point, they travel parallel to the optical axis after passing through the first lens 34.

Figure 3:
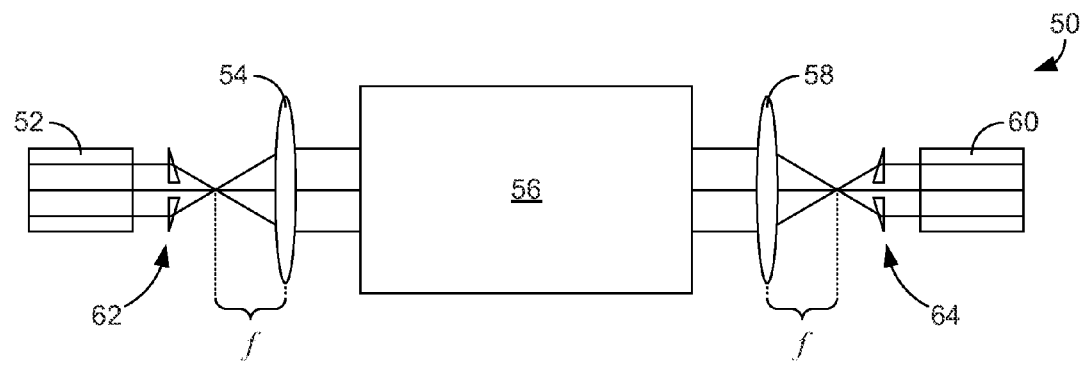
FIG. 3 is a schematic drawing of a third embodiment of an optical system for processing space-multiplexed optical signals.

FIG. 3 illustrates another embodiment of an optical system 50. The system 50 is similar to the system 30 shown in FIG. 2A. Accordingly, the system 50 comprises an input fiber 52, a first lens 54, a photonic imaging processor 56, a second lens 58, and an output fiber 60. In the example of FIG. 3, the input fiber 52 and the output fiber 60 also comprise seven-core multi-core fibers (only three cores are visible). Instead of using facets of the input and output fibers to achieve beam bending, the system 50 uses wedge prisms 62 and 64 that are positioned between the input fiber 52 and the first lens 54 and between the second lens 58 and the output fiber 60, respectively.

Figure 4A:
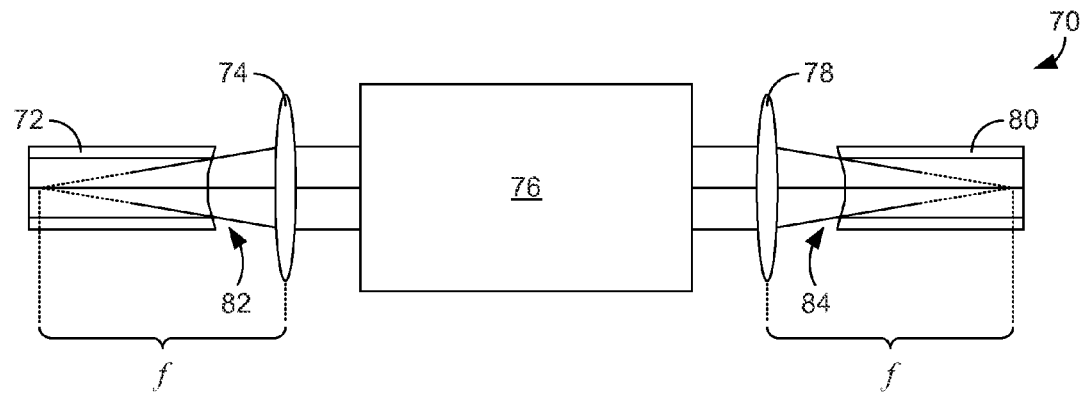
FIG. 4A is a schematic drawing of a fourth embodiment of an optical system for processing space-multiplexed optical signals.
Figure 4B:
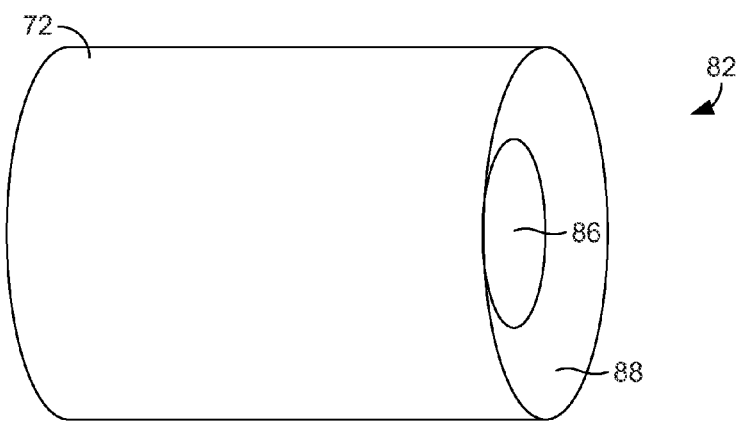
FIG. 4B is a schematic drawing of an input fiber used in the system of FIG. 4A.

In each of the above-described embodiments, the focal points of the lenses are located outside of the input and output fibers. In other embodiments, the focal points of the lenses can be located within the fibers. FIG. 4A illustrates an example of this. As is shown in that figure, an optical system 70 comprises an input fiber 72, a first lens 74, a photonic imaging processor 76, a second lens 78, and an output fiber 80. As is apparent from FIG. 4A, the output end 82 of the input fiber 72 and the input end 84 of the output fiber 80 are concave and faceted. FIG. 4B provides a detail view of the input fiber 72 and its concave, faceted end. As is shown in that figure, the output end 82 of the fiber 72 includes a central circular facet 86 that is perpendicular to the optical axis of the system and an outer circular facet 88 that is angled forward so as to form the concave shape. Referring back to FIG. 4A, the facets create a focal point that is inside the input fiber 72.

Figure 5:
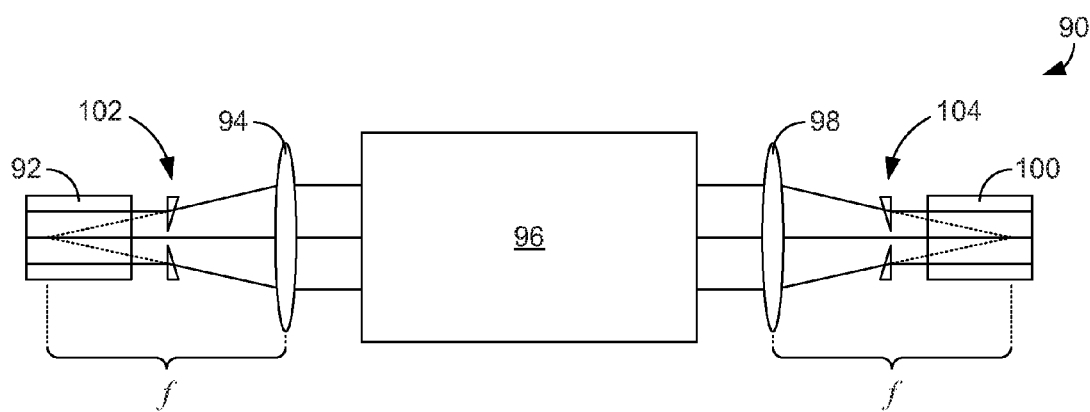
FIG. 5 is a schematic drawing of a fifth embodiment of an optical system for processing space-multiplexed optical signals.

FIG. 5 illustrates another embodiment of an optical system 90. The system 90 comprises an input fiber 92, a first lens 94, a photonic imaging processor 96, a second lens 98, and an output fiber 100. Like the system 50 of FIG. 3, the system 90 uses wedge prisms 102 and 104 that are positioned between the input fiber 92 and the first lens 94 and between the second lens 98 and the output fiber 100, respectively. In the embodiment of FIG. 5, however, the wedge prisms 102, 104 are tiltable so that the focal points of the lenses 94, 98 can be adjusted.

Figure 6:
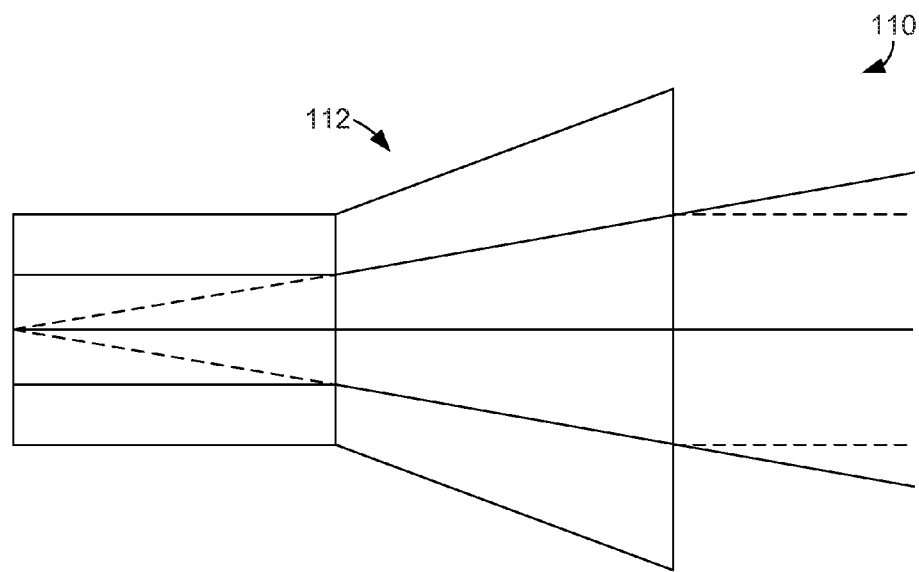
FIG. 6 is a schematic drawing of an optical fiber that can be used in an optical system for processing space-multiplexed optical signals.

FIG. 6 illustrates another method for tilting light beams. In that figure, a tapered optical fiber 110 includes a frusto-conical end 112 that causes the off-axis beams to tilt.

Figure 7:
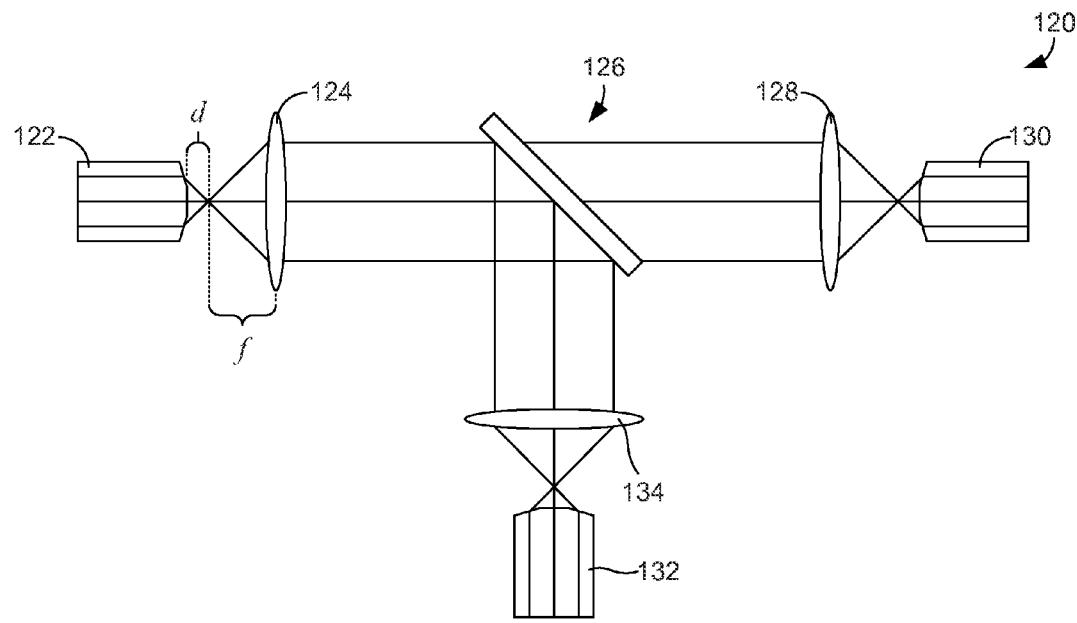
FIG. 7 is a schematic drawing of a sixth embodiment of an optical system for processing space-multiplexed optical signals.

The above-described optical systems each include a photonic signal processor at its center. Any photonic signal processor can be used, and FIGS. 7-15 illustrate some examples. In each example, the signal processor simultaneously processes multiple (e.g., all of) the signals transmitted by the input fiber to reduce the number of components that are needed to achieve the desired processing. FIG. 7 illustrates an optical system 120 in which the signal processor comprises a beam splitter. As is shown in that figure, the optical system 120 comprises an input fiber 122, a first lens 124, a second lens 128, and an output fiber 130. Positioned between the two lenses 124, 128 is a beam splitter 126 that splits the light beams transmitted through the system 120 to divert a portion of each beam to a second output fiber 132, which has its own associated lens 134.

Figure 8:
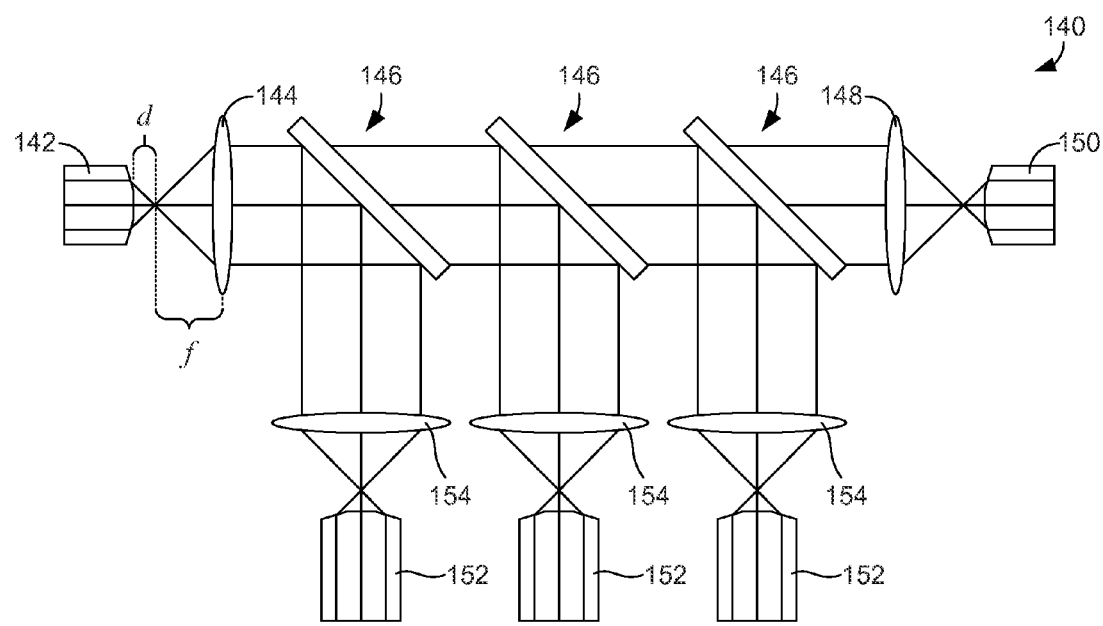
FIG. 8 is a schematic drawing of a seventh embodiment of an optical system for processing space-multiplexed optical signals.

FIG. 8 illustrates a further optical system 140. Like the system 120, the system 140 comprises an input fiber 142, a first lens 144, a second lens 148, and an output fiber 150. Instead of including a single beam splitter, however, the system 140 includes multiple beam splitters 146 that divert a portion of each beam to multiple additional output fibers 152, each having its own associated lens 154.

It is noted that the splitters of FIGS. 7 and 8 function as combiners when operating in reverse direction. Also, when an N to 1 combiner is connected to a 1 to N coupler (splitter), they form a star coupler for multi-core fibers.

Figure 9:
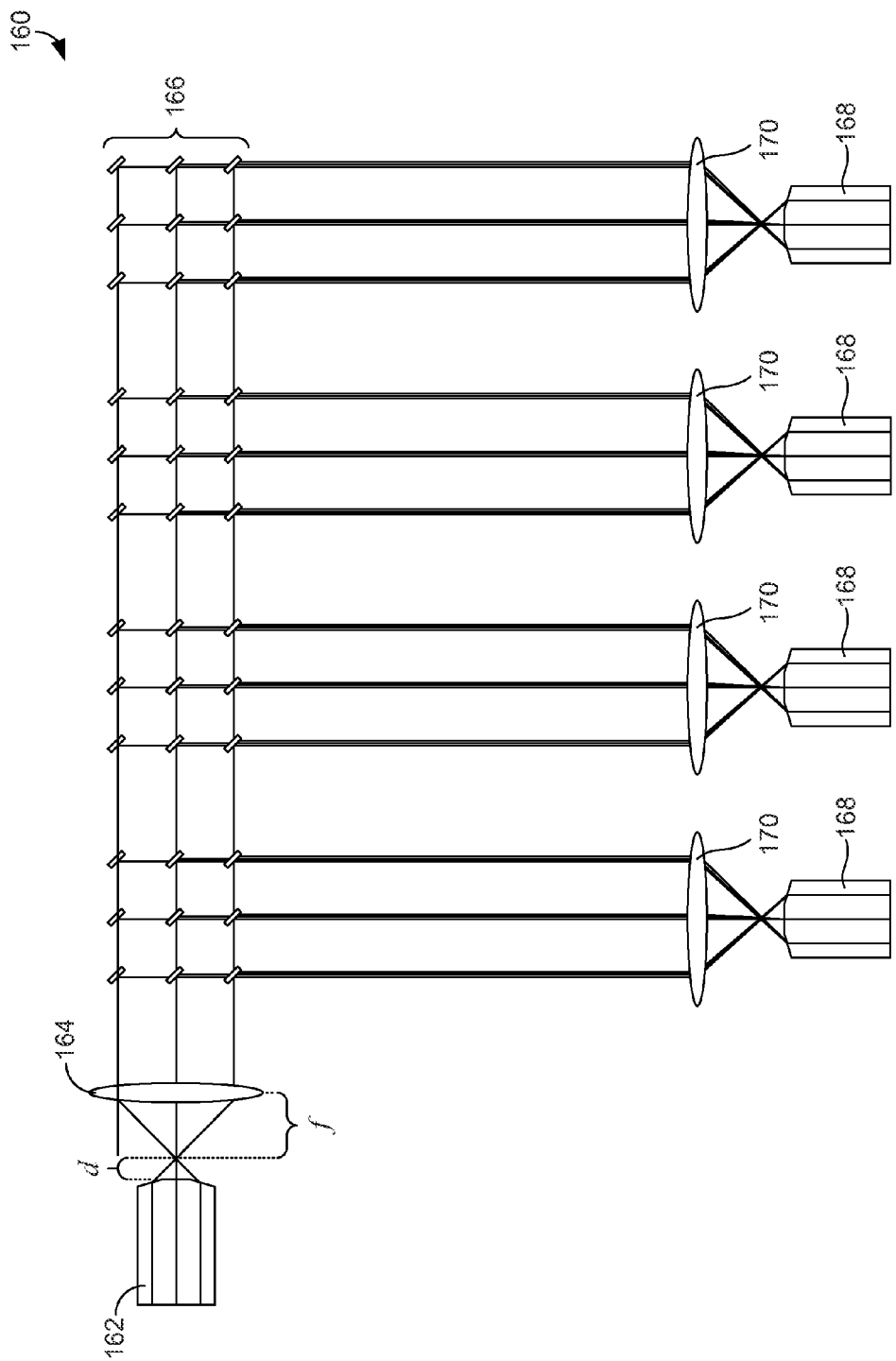
FIG. 9 is a schematic drawing of an eighth embodiment of an optical system for processing space-multiplexed optical signals.

It is also possible to design a multi-core fiber 1×N scrambler in which the incoming signals in each of the input fiber cores are not only divided into the output fibers but also each cores of the output fibers. This can be accomplished by dividing the wavefront of each core and splitting and coupling them into the cores of the output fibers. An example of this is illustrated in FIG. 9. As is shown in that figure, an optical system 160 comprises an input fiber 162, a first lens 164, and multiple splitters 166 that reflect light to multiple output fibers 168, each comprising its own lens 170. As is apparent from FIG. 9, multiple splitters 166 are associated with core of each output fiber 168. In the example of that figure, in which case the input fiber 162 and the output fibers 168 each comprise a seven-core multi-core fiber (only three cores are visible), a matrix of splitters 166 (nine splitters visible) is associated with each output fiber. With such an arrangement, a portion of any one of the light beams from the input fiber 162 can be directed to any one of the cores of any one of the output fibers 168. In some embodiments, each beam splitter 166 can be individually addressed and controlled (e.g., tilted) to control which cores of which output fibers 168 receive which light beams. When an N×1 scrambler is connected to an 1×N scrambler, they form a star scrambler for multi-core fibers.

Figure 10:
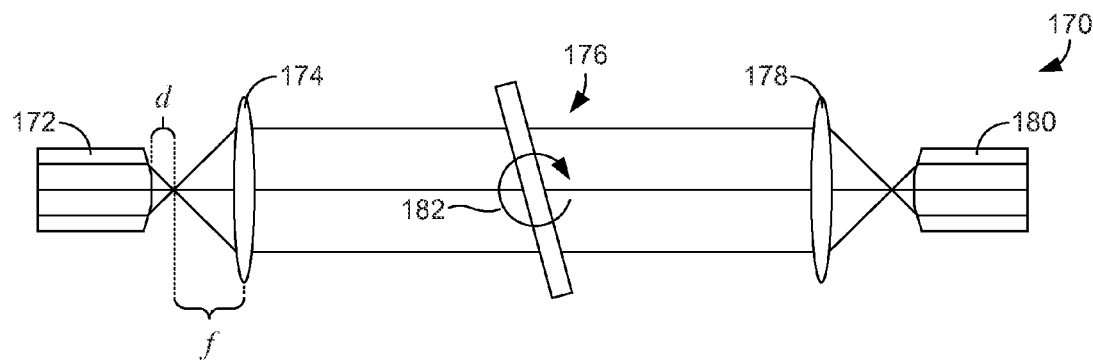
FIG. 10 is a schematic drawing of a ninth embodiment of an optical system for processing space-multiplexed optical signals.

FIG. 10 illustrates an optical system 170 that operates as a band pass filter. As is shown in that figure, the optical system 170 comprises an input fiber 172, a first lens 174, a second lens 178, an output fiber 180, and a tunable-filter 176 that can be tuned to control what frequencies of light can and cannot pass through to the output fiber 180. As is depicted by the arrow 182 in FIG. 10, the filter can be rotated or pivoted to adjust the center of the pass band frequency. In the figure, d is the distance between the fibers 172, 180 and their end focal points and f is the focal length of the lenses 174, 178.

Figure 11A:
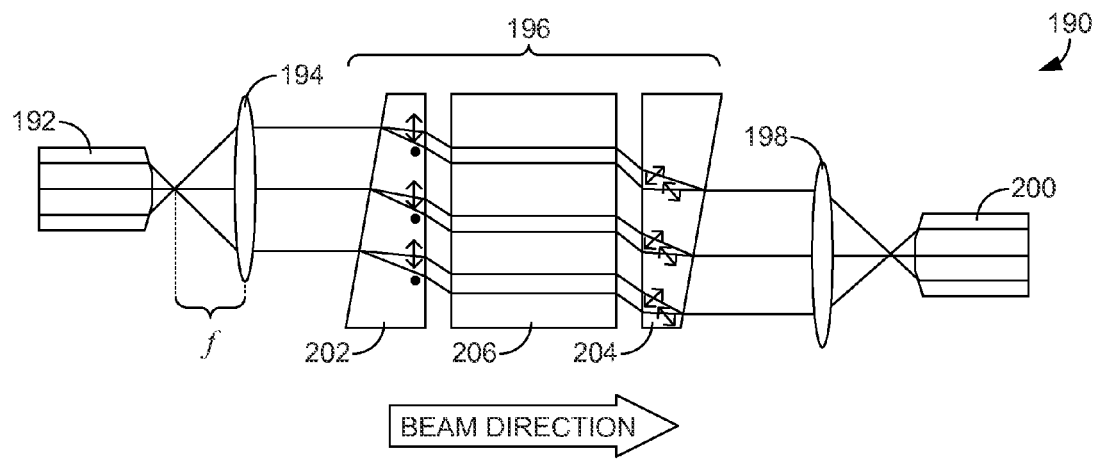
FIGS. 11A and 11B are schematic drawings of a tenth embodiment of an optical system for processing space-multiplexed optical signals.
Figure 11B:
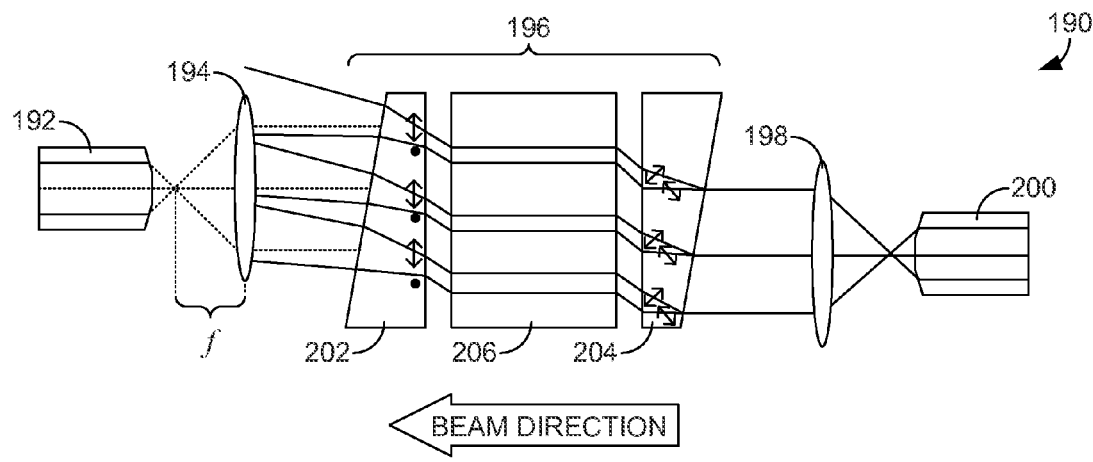

FIGS. 11A and 11B illustrate an optical system 190 that operates as a polarization insensitive optical isolator. As is shown in that figure, the optical system 190 comprises an input fiber 192, a first lens 194, a second lens 198, an output fiber 200, and an isolator 196 that prevents backward propagation of light through the system. In the illustrated embodiment, the isolator 196 comprises two birefringent wedges 202 and 204, and a Faradary rotator 206 that is positioned between the wedges. As is shown in FIG. 11A, the light beams transmitted by the input fiber 192 are coupled to the output fiber 200. However, as is shown in FIG. 11B, light that propagates in the opposite direction does not couple back to the input fiber 192, such that light only transmits in one direction through the system 190.

Figure 12:
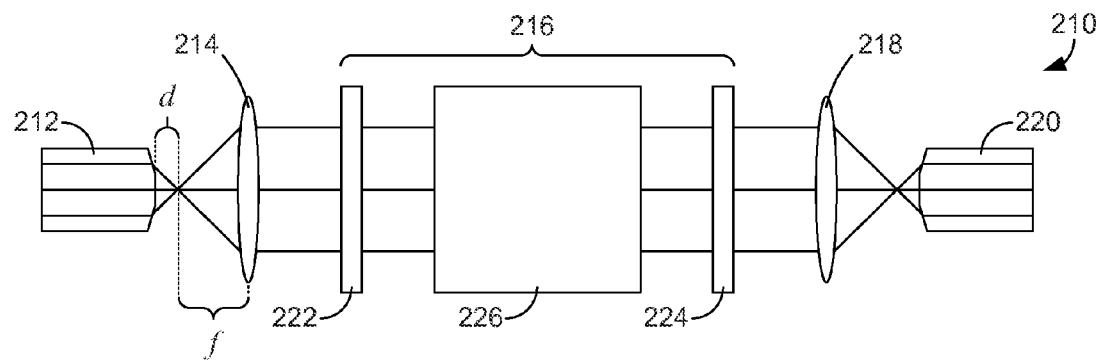
FIG. 12 is a schematic drawing of an eleventh embodiment of an optical system for processing space-multiplexed optical signals.

FIG. 12 illustrates an optical system 210 that operates as a polarization sensitive optical isolator. As is shown in that figure, the optical system 210 comprises an input fiber 212, a first lens 214, a second lens 218, an output fiber 220, and an isolator 216 that comprises two polarizers 222 and 224, and a Faraday rotator 226 positioned between the polarizers. Light traveling in the forward direction becomes polarized vertically by the first polarizer 222. The Faraday rotator 226 rotates the polarization by 45°, which is parallel to the second polarizer 224. Therefore, the light passes through the isolator to the output fiber 220. Light traveling in the backward direction becomes polarized at 45° degrees by the second polarizer 224. The Faraday rotator 226 again rotates the polarization by 45°, which results in horizontal polarization. The polarization provided by the first polarizer 222 will eliminate the horizontal polarization, thereby preventing backward propagation of light to the input fiber 212.

Figure 13:
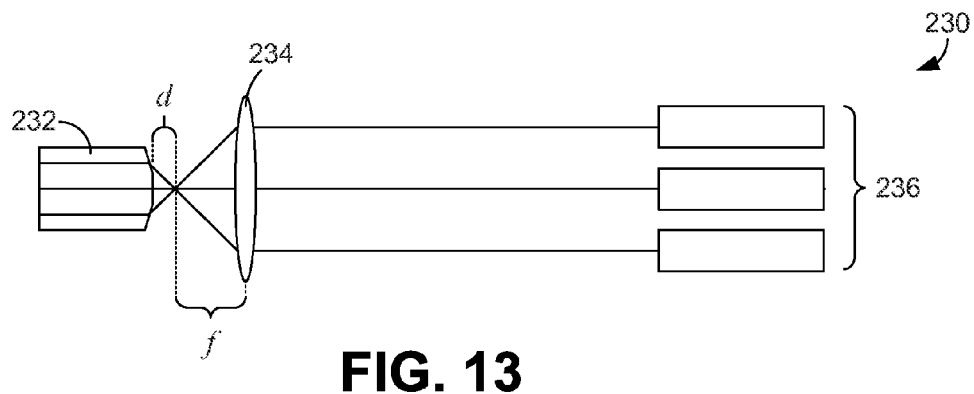
FIG. 13 is a schematic drawing of a twelfth embodiment of an optical system for processing space-multiplexed optical signals.

In the above-described embodiments, it has been assumed that the output fiber is the same type of fiber as the input fiber. It is noted that this does not need to be the case. FIG. 13 illustrates an example alternative arrangement. In the optical system 230 of FIG. 13, the beams from a multi-core input fiber 232 pass through a lens 234 and are separately provided to independent single mode output fibers 236. With such an arrangement, the various signals carried by the input fiber 232 can be de-multiplexed. In the figure, d is the distance between fiber end focal point, and f is the focal length of the lens. The height of the beams after passing through the lens 234 can be tuned by changing the f/d ratio.

Figure 14:
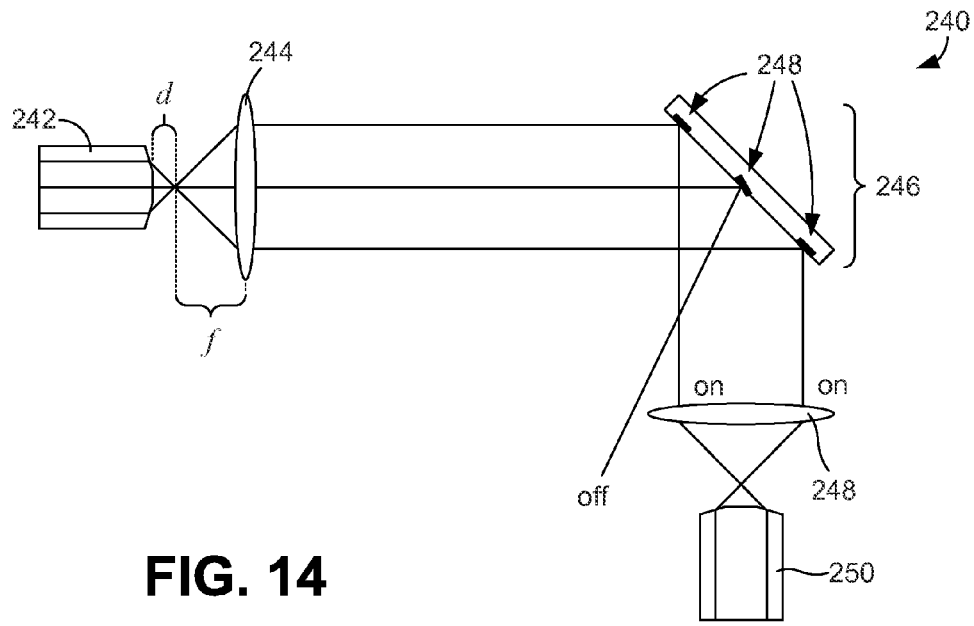
FIG. 14 is a schematic drawing of a thirteenth embodiment of an optical system for processing space-multiplexed optical signals.
Figure 15:
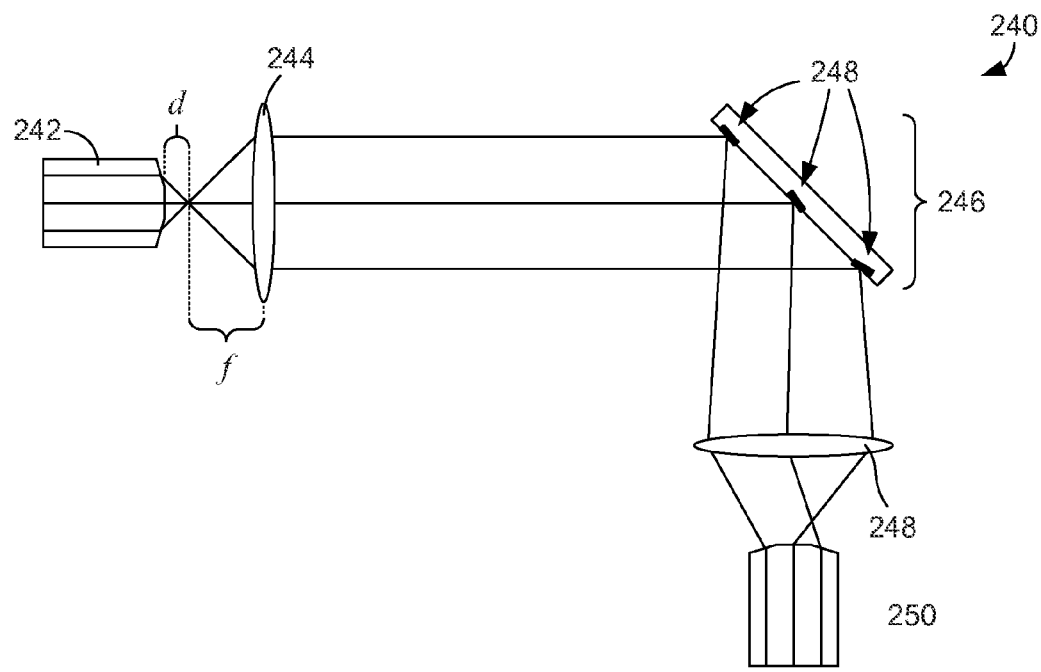
FIG. 15 is a schematic drawing of a fourteenth embodiment of an optical system for processing space-multiplexed optical signals.

FIG. 14 illustrates an optical system 240 that operates as an optical switch. The system 240 includes an input fiber 242, a first lens 244, a second lens 248, an output fiber 250, and an switch 246 in the form of a microelectromechanical system (MEMS) that includes multiple actuable mirrors 248 that can be individually addressed and tilted to either reflect a beam to the output fiber 250 or not. The system 240 can also be operated as an optical cross-connect. FIG. 15 illustrates such functionality. Notably, previous designs that use MEMS for optical switching or optical cross-connects implement lens arrays, which require difficult and time consuming fabrication techniques. In contrast, the systems of FIGS. 14 and 15 only use a single lens, which makes them cheaper, more rigid, and easier to align.

The above-described photonic signal processing techniques can be incorporated in a variety of different optical communication and networking applications. Example applications are described below in relation to FIGS. 16-20.

Figure 16:
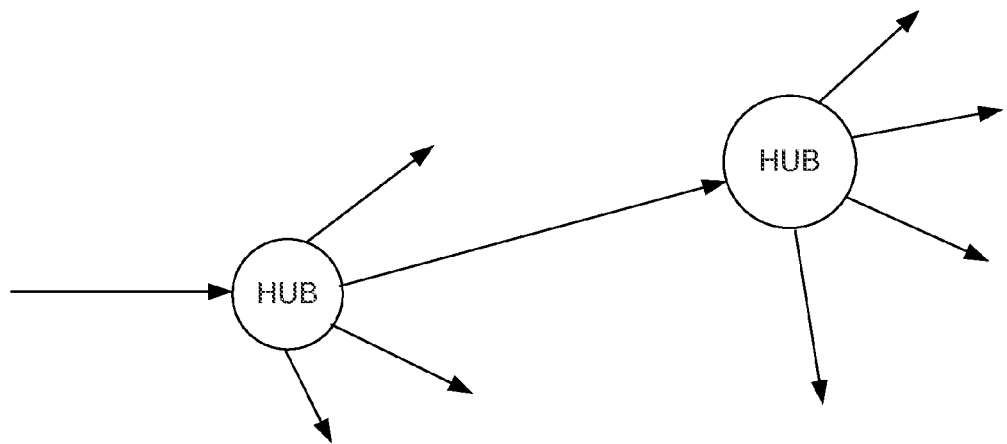
FIG. 16 is a schematic drawing of a first embodiment of a network that includes an optical system for processing space-multiplexed optical signals.
Figure 17:
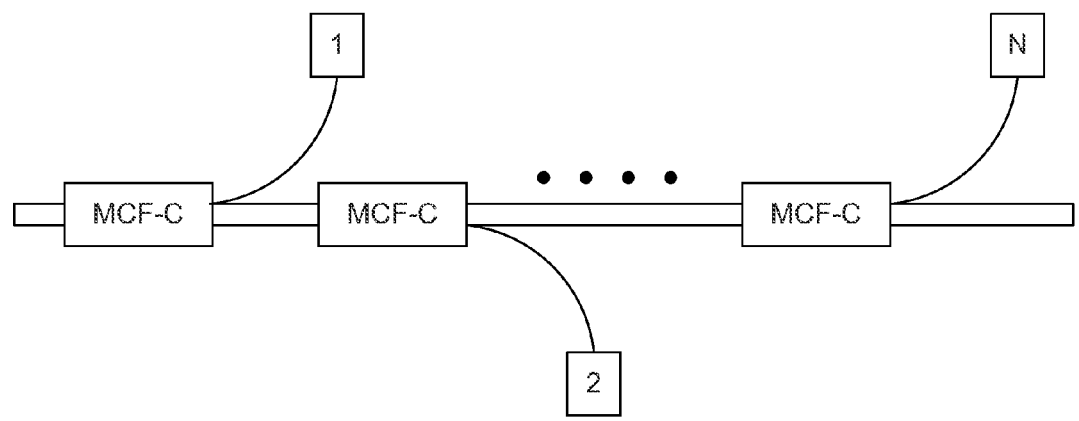
FIG. 17 is a schematic drawing of a second embodiment of a network that includes an optical system for processing space-multiplexed optical signals.

One application of the photonic signal processing techniques is multi-core broadcast and distribution optical networks. Multi-core fiber photonic signal processors can be used to build a hub/tree system 260 as shown in FIG. 16, or a bus system 270 as shown in FIG. 17. The hub/tree system 260 requires power splitters and the bus system 270 requires couplers or taps.

Figure 18:
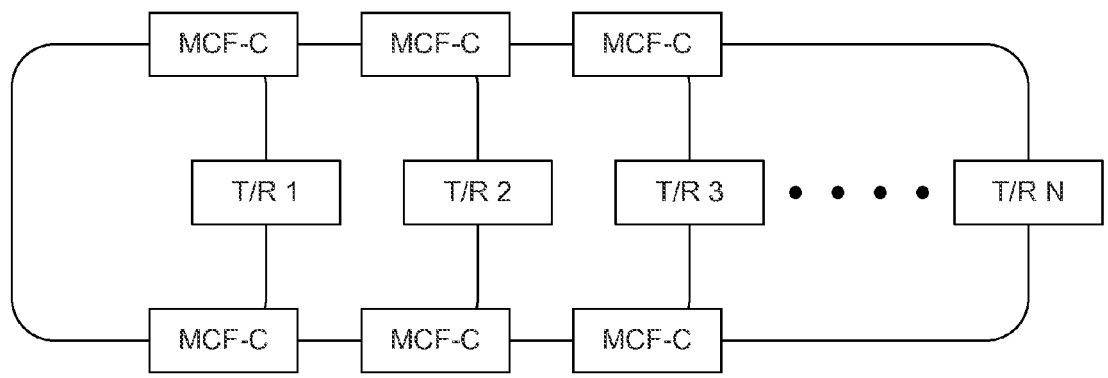
FIG. 18 is a schematic drawing of a third embodiment of a network that includes an optical system for processing space-multiplexed optical signals.
Figure 19:
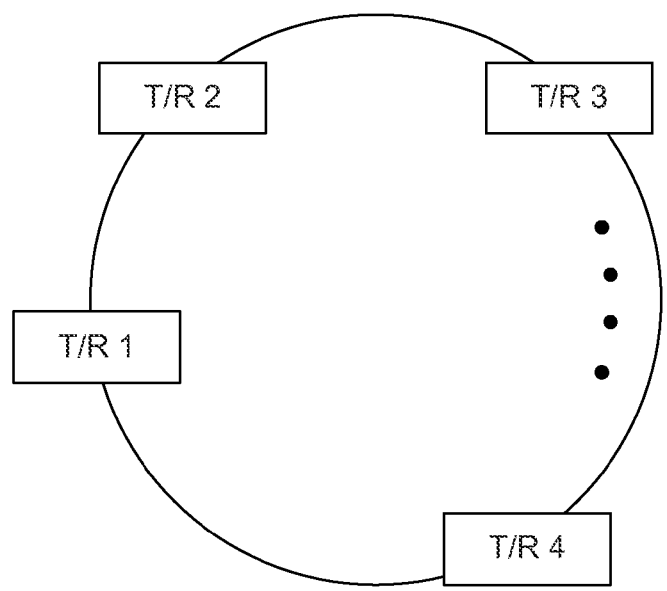
FIG. 19 is a schematic drawing of a fourth embodiment of a network that includes an optical system for processing space-multiplexed optical signals.
Figure 20:
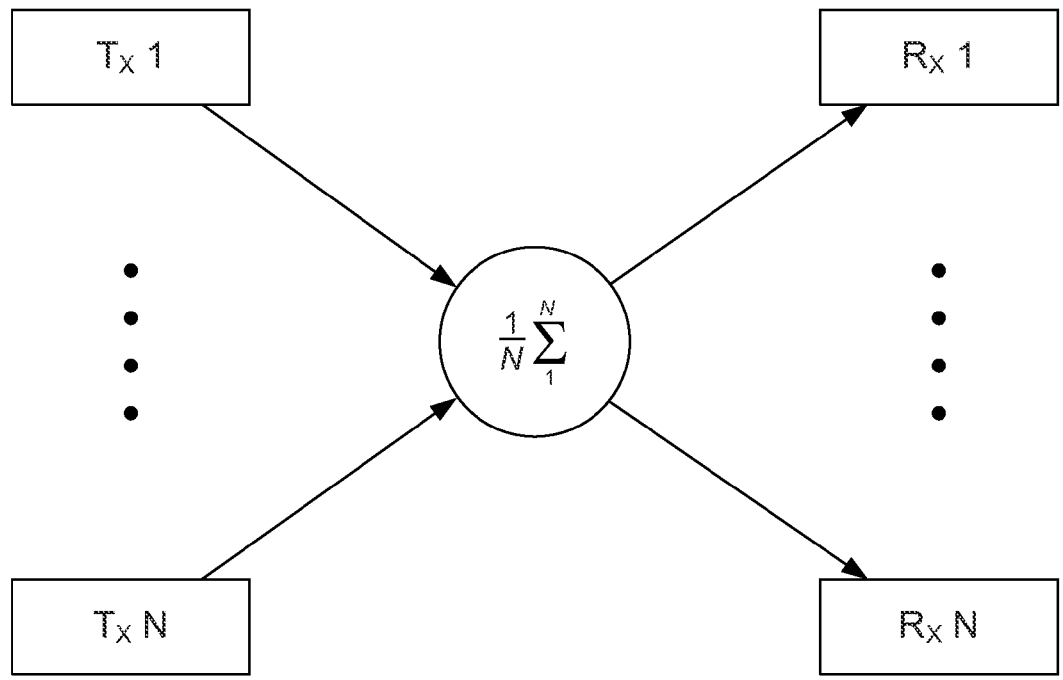
FIG. 20 is a schematic drawing of a fifth embodiment of a network that includes an optical system for processing space-multiplexed optical signals.

Another application of the photonic signal processing techniques is multi-core, multi-access networks. Multi-core fiber photonic signal processors can be used to build a bus system 280 as shown in FIG. 18, a ring system 290 as shown in FIG. 19, or a star system 300 as shown in FIG. 20. The bus system 280 and the ring system 290 require couplers, and the star system 300 requires star couplers.

In multi-access networks, it is important to provide a protocol for multiple access. For current passive optical networks (PON) with single mode fibers, upstream traffic uses time-division multiple access (TDMA). Code-division multiple access (CDMA), in which each user has a unique (and often orthogonal) code that can be identified through correlation techniques, has been an active research topic. So far, the most commonly used codes are temporal or spectral. These are called one-dimensional (1D) codes.

The existing 1D codes for multi-access optical networks can be combined with space codes enabled by multiple cores of the multi-core fiber to form two-dimensional (2D) codes. Temporal codes have been proposed to be combined with spatial codes using a bundle of fiber. 2D spatio-temporal codes in combination with multi-core fiber can be used to solve one of the problems with fiber bundle, namely relative delays among the fiber bundle. For multi-core fiber, the relative delay will be so small that any delays among the multiple cores can be addressed in the electrical domain.

In a similar manner, existing 2D OCDMA codes that do not use space as one of the dimensions can be combined with space codes enabled by multiple cores of the multi-core fiber to form three-dimensional (3D) codes. As an example, wavelength-hopping/time-spreading optical code division multiple-access is an existing 2D coding approach that employs both wavelength and time dimensions. The wavelength-hopping/time-spreading optical code can be used in combination with space codes enabled by multiple cores of the multi-core fiber to form three-dimensional codes for multi-access optical networks.

As indicated above, the disclosed embodiments are only example embodiments of the disclosed inventions. Other alternatives are possible. For example, while various types of photonic signal processors have been described and illustrated, it is noted that other processors could be used. For example, the processor can comprise a bulk amplifier that incorporates gain media.

We claim:

1. A space-division multiplexed optical system for processing space-multiplexed optical signals, the system comprising:
   a space division multiplexing-supporting input fiber adapted to simultaneously propagate multiple spatially-separated optical signals, wherein each of the simultaneously propagated, multiple spatially-separated optical signals comprises a plurality of different wavelengths;

an output fiber that receives at least one of the optical signals;

a photonic signal processor positioned between the input fiber and the output fiber that receives the multiple spatially-separated optical signals from the input fiber and simultaneously processes those signals; and at least one tilted, light refracting surface disposed between the input fiber and the photonic signal processor adapted to redirect a plurality of the optical signals in free space propagation before they are input to the photonic signal processor, wherein the at least one tilted, light refracting surface is a planar, angled facet of the input fiber that tilts off-axis beams of light as they exit the fiber, further wherein the input fiber includes a central facet that is perpendicular to an optical axis of the system and an outer facet that extends at least one of forward and backward from the central facet.

2. The system of claim 1, wherein the input fiber is a multimode fiber, multi-core fiber, or a fiber bundle.

3. The system of claim 1, wherein the input fiber is a multi-core fiber having multiple cores and at least one of the cores supports multiple spatial modes.

4. The system of claim 1, further comprising a first lens positioned between the input fiber and the photonic signal processor and a second lens positioned between the photonic signal processor and the output fiber.

5. The system of claim 1, wherein the at least one tilted, light refracting surface is a surface of a wedge prism that tilts off-axis light beams from the input fiber.

6. The system of claim 1, wherein the photonic signal processor comprises a beam splitter that splits light beams transmitted by the input fiber and a further output fiber that receives at least one of the split light beams.

7. The system of claim 1, wherein the optical system operates as a scrambler and the photonic signal processor comprises a multiple beam splitters and multiple output fibers, wherein a matrix of beam splitters is associated with each output fiber, each matrix having multiple beam splitters for each core of the output fibers.

8. The system of claim 1, wherein the optical system operates as a band pass filter and the photonic signal processor comprises a tunable filter that filters the optical signals.

9. The system of claim 1, wherein the optical system operates as a polarization insensitive isolator and the photonic signal processor comprises two birefringent lenses and a Faraday rotator positioned between the lenses.

10. The system of claim 1, wherein the optical system operates as a polarization sensitive isolator and the photonic signal processor comprises two polarizers and a Faraday rotator positioned between the polarizers.

11. The system of claim 1, wherein there are multiple output fibers and each output fiber receives a single optical signal.

12. The system of claim 1, wherein the optical system operates as an optical switch and the photonic signal processor is a microelectricalmechanical system (MEMS) that includes actuable mirrors that can be individually addressed and tilted.

13. The system of claim 1, wherein the optical system operates as an optical cross-connect and the photonic signal processor is a microelectricalmechanical system (MEMS) that includes mirrors that can be individually addressed and tilted.

14. The system of claim 1, further comprising a second tilted, light refracting surface positioned at an input end of the output fiber that redirects the at least one of the optical signals after it has been processed by the photonic signal processor.

15. A space-division multiplexed optical system for processing space-multiplexed optical signals, the system comprising:

a SDM multi-core input fiber that comprises multiple cores, each core being configured to simultaneously propagate a separate optical signal, wherein each of the separate optical signals comprises a plurality of different wavelengths;

a photonic signal processor configured to receive the optical signals and simultaneously processes those signals;

a first at least one tilted, light refracting surface disposed between the input fiber and the photonic signal processor adapted to redirect a plurality of the optical signals before they are input to the photonic signal processor;

a multi-core output fiber having the same number of cores as the input fiber, the cores being configured to receive the processed optical signals from the photonic signal processor;

a second at least one tilted, light refracting surface disposed between the photonic signal processor and the output fiber configured to redirect at least one of the processed optical signals toward a core of the output fiber;

a first lens positioned between the first tilted, light refracting surface and the photonic signal processor; and a second lens positioned between the photonic signal processor and the second tilted, light refracting surface;

wherein the optical signals propagated by the input fiber are imaged onto the output fiber with the first and second tilted, light refracting surfaces and the lenses.

16. The system of claim 15, wherein the photonic signal processor comprises a beam splitter that splits light beams transmitted by the input fiber and a further output fiber that receives at least one of the split light beams.

17. The system of claim 15, wherein the optical system operates as a scrambler and the photonic signal processor comprises a multiple beam splitters and multiple output fibers, wherein a matrix of beam splitters is associated with each output fiber, each matrix having multiple beam splitters for each core of the output fibers.

18. The system of claim 15, wherein the optical system operates as a band pass filter and the photonic signal processor comprises a tunable filter that filters the optical signals.

19. The system of claim 15, wherein the optical system operates as a polarization insensitive isolator and the photonic signal processor comprises two birefringent lenses and a Faraday rotator positioned between the lenses.

20. The system of claim 15, wherein the optical system operates as a polarization sensitive isolator and the photonic signal processor comprises two polarizers and a Faraday rotator positioned between the polarizers.

21. The system of claim 15, wherein there are multiple output fibers and each output fiber receives a single optical signal.

22. The system of claim 15, wherein the optical system operates as an optical switch and the photonic signal processor is a microelectricalmechanical system (MEMS) that includes actuable mirrors that can be individually addressed and tilted.

23. The system of claim 15, wherein the optical system operates as an optical cross-connect and the photonic signal processor is a microelectricalmechanical system (MEMS) that includes mirrors that can be individually addressed and tilted.

24. The system of claim 15, wherein the first tilted, light refracting surface comprises a facet formed on the output end of the input fiber and the second tilted, light refracting surface comprises a facet formed on the input end of the output fiber.

25. The system of claim 15, wherein the first tilted, light refracting surface is a surface of a first wedge prism that is separate from the input fiber and the second tilted, light refracting surface is a surface of a second wedge prism that is separate from the output fiber.

26. A method for processing space-multiplexed optical signals, the method comprising:
propagating multiple spatially-separated optical signals in a space-multiplexed optical system in an input fiber, wherein each of the spatially-separated optical signals comprises a plurality of different wavelengths;
redirecting at least one of the optical signals through free-space propagation with a first angled planar surface to further separate the optical signals;
receiving the optical signals with a photonic signal processor and simultaneously processing the optical signals with the photonic signal processor; and
redirecting at least one of the processed optical signals through free-space propagation to an output fiber with a second angled planar surface.

27. The method of claim 26, wherein the input fiber and the output fiber are each one of a multimode fiber, multi-core fiber, or a fiber bundle.

28. A space-division multiplexed optical system for processing space-multiplexed optical signals, the system comprising:
an input fiber that propagates multiple spatially-separated optical signals, wherein each of the spatially-separated optical signals comprises a plurality of different wavelengths;
an output fiber that receives at least one of the optical signals;
a photonic signal processor positioned between the input fiber and the output fiber that receives the multiple spatially-separated optical signals from the input fiber and simultaneously processes those signals; and
a plurality of differently-angled planar surfaces disposed adjacent an output end of the input fiber and configured to converge or diverge the multiple spatially-separated optical signals to a common point along an optical axis of the optical system before the multiple spatially-separated optical signals from the input fiber are input to the photonic signal processor.

* * * * *